US012517328B2

(12) United States Patent
Jo et al.

(10) Patent No.: US 12,517,328 B2
(45) Date of Patent: Jan. 6, 2026

(54) OPTICAL SYSTEM

(71) Applicant: Samsung Electro-Mechanics Co., Ltd., Suwon-si (KR)

(72) Inventors: Yong Joo Jo, Suwon-si (KR); Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/322,368

(22) Filed: May 23, 2023

(65) Prior Publication Data

US 2023/0296865 A1   Sep. 21, 2023

Related U.S. Application Data

(60) Continuation of application No. 16/441,605, filed on Jun. 14, 2019, now Pat. No. 11,698,513, which is a division of application No. 15/059,888, filed on Mar. 3, 2016, now Pat. No. 10,444,470.

(30) Foreign Application Priority Data

Jul. 16, 2015   (KR) .................. 10-2015-0101227

(51) Int. Cl.
*G02B 3/02* (2006.01)
*G02B 9/62* (2006.01)
*G02B 13/00* (2006.01)
*G02B 13/18* (2006.01)
G02B 13/06 (2006.01)

(52) U.S. Cl.
CPC ........... *G02B 13/0045* (2013.01); *G02B 9/62* (2013.01); *G02B 13/06* (2013.01); *G02B 13/18* (2013.01)

(58) Field of Classification Search
CPC ...... G02B 9/62; G02B 13/0045; G02B 13/06; G02B 13/18
USPC ........................................ 359/708, 713, 756
See application file for complete search history.

(56) References Cited

U.S. PATENT DOCUMENTS 9,217,848 B1   12/2015   Chen et al.
9,442,274 B2   9/2016    Huang
9,482,847 B1   11/2016   Liu et al.
(Continued)

FOREIGN PATENT DOCUMENTS

CN   102692699 A   9/2012
CN   104678537 A   6/2015
(Continued)

OTHER PUBLICATIONS

Korean Office Action issued on Nov. 1, 2016 in counterpart Korean Application No. 10-2015-0101227 (9 pages in English; 7 pages in Korean).

(Continued)

*Primary Examiner* — Mahidere S Sahle
(74) *Attorney, Agent, or Firm* — NSIP Law

(57) ABSTRACT

An optical system includes a first through six lenses. The first lens includes a positive refractive power. The second lens includes a negative refractive power. The third lens includes a positive refractive power. The fourth lens includes a negative refractive power and the fifth lens includes a negative refractive power. The sixth lens includes a positive refractive power and an inflection point formed on an image-side surface thereof and 70<FOV is satisfied, where FOV is a field of view of the optical system.

18 Claims, 12 Drawing Sheets

(56) References Cited

U.S. PATENT DOCUMENTS

| | | |
|---|---|---|
| 9,678,307 B2 | 6/2017 | Park |
| 2009/0203963 A1 | 8/2009 | Ito |
| 2012/0229917 A1* | 9/2012 | Huang ............... G02B 13/0045 |
| | | 359/713 |
| 2012/0243078 A1 | 9/2012 | Kajitani et al. |
| 2012/0243108 A1 | 9/2012 | Tsai et al. |
| 2012/0314301 A1 | 12/2012 | Huang et al. |
| 2013/0194678 A1 | 8/2013 | Suzuki et al. |
| 2014/0063616 A1* | 3/2014 | Okano ............... G02B 13/0045 |
| | | 359/713 |
| 2014/0254029 A1 | 9/2014 | Hsu et al. |
| 2014/0354872 A1* | 12/2014 | Chen ............... G02B 13/0045 |
| | | 359/713 |
| 2014/0368927 A1 | 12/2014 | Hsu et al. |
| 2015/0042862 A1 | 2/2015 | Huang |
| 2015/0049393 A1 | 2/2015 | Park |
| 2015/0062721 A1 | 3/2015 | Kim et al. |
| 2015/0116573 A1* | 4/2015 | Liao ..................... H04N 23/55 |
| | | 359/713 |
| 2015/0124333 A1 | 5/2015 | Noda et al. |
| 2015/0131167 A1 | 5/2015 | Park et al. |
| 2015/0146092 A1 | 5/2015 | Chen |
| 2015/0153546 A1 | 6/2015 | Tang et al. |
| 2015/0160435 A1 | 6/2015 | Chen et al. |
| 2015/0192760 A1 | 7/2015 | Huang |
| 2015/0205071 A1 | 7/2015 | Hashimoto |
| 2015/0241659 A1 | 8/2015 | Huang |
| 2015/0247997 A1 | 9/2015 | Nagatoshi |
| 2015/0253541 A1 | 9/2015 | Hsu et al. |
| 2015/0260964 A1 | 9/2015 | Noda |
| 2015/0338614 A1 | 11/2015 | Tang et al. |
| 2015/0362697 A1* | 12/2015 | Hsu ................... G02B 13/0045 |
| | | 348/340 |
| 2015/0362703 A1* | 12/2015 | Park ........................ G02B 9/62 |
| | | 359/713 |
| 2015/0370042 A1 | 12/2015 | Chen et al. |
| 2016/0033744 A1 | 2/2016 | Tsai et al. |
| 2016/0085052 A1 | 3/2016 | Park |
| 2016/0109688 A1 | 4/2016 | Jo |
| 2016/0124186 A1 | 5/2016 | Tang et al. |
| 2016/0124189 A1* | 5/2016 | Park ................... G02B 13/0045 |
| | | 359/756 |
| 2016/0124191 A1 | 5/2016 | Hashimoto |
| 2016/0131870 A1 | 5/2016 | Tang et al. |
| 2016/0131871 A1 | 5/2016 | Tang et al. |
| 2016/0131874 A1 | 5/2016 | Tang et al. |
| 2016/0139366 A1 | 5/2016 | Jung |
| 2016/0161721 A1* | 6/2016 | Chen ................... G02B 13/0045 |
| | | 359/713 |
| 2016/0216481 A1* | 7/2016 | Chen ................... G02B 13/0045 |
| 2016/0327772 A1* | 11/2016 | Liao ....................... G02B 13/18 |
| 2016/0341929 A1* | 11/2016 | Liu ........................... G02B 9/62 |
| 2017/0293114 A1* | 10/2017 | Chen ................... G02B 13/0045 |
| 2017/0322392 A1* | 11/2017 | Katsuragi ................ G02B 9/62 |
| 2019/0187440 A1* | 6/2019 | Huang ............... G02B 13/0045 |
| 2020/0209528 A1 | 7/2020 | Liao et al. |
| 2021/0318523 A1 | 10/2021 | Chae |

FOREIGN PATENT DOCUMENTS

| | | |
|---|---|---|
| CN | 104765132 A | 7/2015 |
| CN | 204462518 U | 7/2015 |
| CN | 106154486 A | 11/2016 |
| CN | 106199904 A | 12/2016 |
| KR | 10-0962970 B1 | 6/2010 |
| KR | 10-0962999 B1 | 6/2010 |
| KR | 10-2015-0070858 * | 6/2015 |
| TW | 201411182 A | 3/2014 |
| TW | 201418763 A | 5/2014 |
| TW | 201423145 A | 6/2014 |
| TW | 201439582 A | 10/2014 |
| TW | 104113652 | 4/2015 |

OTHER PUBLICATIONS

Korean Office Action issued on Mar. 16, 2017 in corresponding Korean Patent Application No. 10-2015-0101227 (3 pages in English and 3 pages in Korean).

Taiwanese Office Action issued on May 11, 2017 in corresponding Taiwanese Patent Application No. 105105760 (7 pages in English and 8 pages in Taiwanese).

Chinese Office Action issued on Mar. 29, 2018 in counterpart Chinese Patent Application No. 201610154102.8 (23 pages, in Chinese with English translation).

Chinese Office Action issued on May 26, 2020 issued in counterpart Chinese Patent Application No. 201810914888.8 (5 pages in English and 6 pages in Chinese).

Chinese Office Action Issued on Jun. 11, 2021, in Counterpart Chinese Patent Application No. 201810914888.8 (5 pages in English and 7 pages in Chinese).

U.S. Appl. No. 16/441,605, filed Jun. 14, 2019, Jo et al., Samsung Electro-Mechanics Co., Ltd.

U.S. Appl. No. 15/059,888, filed Mar. 3, 2016, Jo et al., Samsung Electro-Mechanics Co., Ltd.

* cited by examiner

| FIRST EMBODIMENT |||||||
|---|---|---|---|---|---|---|
| F number= | 1.90 | TTL= | 4.47 | f= | 3.68 ||
| SURFACE NUMBER | | RADIUS OF CURVATURE | THICKNESS /DISTANCE | REFRACTIVE INDEX | ABBE NUMBER | FOCAL LENGTH |
| 0 | STOP | | −0.2000 | | | |
| 1 | FIRST LENS | 1.4759 | 0.7099 | 1.544 | 55.9 | 2.560 |
| 2 | | −22.0410 | 0.0400 | | | |
| 3 | SECOND LENS | 6.5387 | 0.2500 | 1.634 | 23.8 | −5.080 |
| 4 | | 2.1516 | 0.2651 | | | |
| 5 | THIRD LENS | −350.0000 | 0.5487 | 1.544 | 55.9 | 11.330 |
| 6 | | −6.0880 | 0.2639 | | | |
| 7 | FOURTH LENS | −1.9016 | 0.3200 | 1.649 | 21.0 | −738.79 |
| 8 | | −2.0365 | 0.0400 | | | |
| 9 | FIFTH LENS | −565.9689 | 0.4519 | 1.649 | 21.0 | −5.130 |
| 10 | | 3.3954 | 0.0400 | | | |
| 11 | SIXTH LENS | 1.1855 | 0.5754 | 1.534 | 52.0 | 10.960 |
| 12 | | 1.2327 | 0.2150 | | | |
| 13 | FILTER | INFINITY | 0.1100 | 1.520 | 60.0 | |
| 14 | | INFINITY | 0.6260 | | | |
| 15 | IMAGING PLANE | INFINITY | 0.0140 | | | |

FIG. 3

| SECOND EMBODIMENT ||||||
|---|---|---|---|---|---|
| F number= 1.99 TTL= 4.470 f= 3.680 ||||||
| SURFACE NUMBER | | RADIUS OF CURVATURE | THICKNESS /DISTANCE | REFRACTIVE INDEX | ABBE NUMBER | FOCAL LENGTH |
| 0 | STOP | | -0.2000 | | | |
| 1 | FIRST LENS | 1.4772 | 0.7082 | 1.544 | 55.9 | 2.560 |
| 2 | | -21.8520 | 0.0400 | | | |
| 3 | SECOND LENS | 6.5585 | 0.2500 | 1.634 | 23.8 | -5.080 |
| 4 | | 2.1535 | 0.2720 | | | |
| 5 | THIRD LENS | -350.0000 | 0.5467 | 1.544 | 55.9 | 11.390 |
| 6 | | -6.1208 | 0.2644 | | | |
| 7 | FOURTH LENS | -1.9101 | 0.3200 | 1.649 | 21.0 | -2316.64 |
| 8 | | -2.0395 | 0.0400 | | | |
| 9 | FIFTH LENS | -351.9330 | 0.4439 | 1.649 | 21.0 | -5.130 |
| 10 | | 3.4084 | 0.0400 | | | |
| 11 | SIXTH LENS | 1.1871 | 0.5799 | 1.534 | 52.0 | 10.950 |
| 12 | | 1.2335 | 0.2149 | | | |
| 13 | FILTER | INFINITY | 0.1100 | 1.520 | | |
| 14 | | INFINITY | 0.6254 | | | |
| 15 | IMAGING PLANE | INFINITY | 0.0181 | | | |

FIG. 6

| THIRD EMBODIMENT ||||||
|---|---|---|---|---|---|
| F number= 1.99 | | TTL= 4.470 | | f= 3.690 | |
| SURFACE NUMBER | | RADIUS OF CURVATURE | THICKNESS /DISTANCE | REFRACTIVE INDEX | ABBE NUMBER | FOCAL LENGTH |
| 0 | STOP | | −0.2 | | | |
| 1 | FIRST LENS | 1.4918 | 0.7069 | 1.544 | 55.9 | 2.530 |
| 2 | | −15.8310 | 0.0400 | | | |
| 3 | SECOND LENS | 7.6536 | 0.2500 | 1.634 | 23.8 | −4.700 |
| 4 | | 2.1467 | 0.2936 | | | |
| 5 | THIRD LENS | −350.0000 | 0.5110 | 1.544 | 55.9 | 10.900 |
| 6 | | −5.8620 | 0.2752 | | | |
| 7 | FOURTH LENS | −1.9503 | 0.3200 | 1.634 | 23.8 | −151.35 |
| 8 | | −2.1182 | 0.0686 | | | |
| 9 | FIFTH LENS | −69.3571 | 0.3800 | 1.634 | 23.8 | −5.120 |
| 10 | | 3.4800 | 0.0400 | | | |
| 11 | SIXTH LENS | 1.1242 | 0.6077 | 1.534 | 52.0 | 9.060 |
| 12 | | 1.1856 | 0.2270 | | | |
| 13 | FILTER | INFINITY | 0.1100 | | | |
| 14 | | INFINITY | 0.6277 | | | |
| 15 | IMAGING PLANE | INFINITY | 0.0123 | | | |

FIG. 9

| FOURTH EMBODIMENT ||||||
|---|---|---|---|---|---|
| F number= 1.90 | | TTL= 5.300 | | f= 4.400 | |
| SURFACE NUMBER | | RADIUS OF CURVATURE | THICKNESS /DISTANCE | REFRACTIVE INDEX | ABBE NUMBER | FOCAL LENGTH |
| 0 | STOP | | | | | |
| 1 | FIRST LENS | 1.7450 | 0.8594 | 1.544 | 56.0 | 2.880 |
| 2 | | -13.2422 | 0.0470 | | | |
| 3 | SECOND LENS | 10.9837 | 0.2939 | 1.650 | 21.5 | -4.950 |
| 4 | | 2.4842 | 0.3179 | | | |
| 5 | THIRD LENS | -411.4861 | 0.4273 | 1.544 | 56.0 | 20.700 |
| 6 | | -11.0120 | 0.3207 | | | |
| 7 | FOURTH LENS | -3.2406 | 0.4115 | 1.650 | 21.5 | -74.30 |
| 8 | | -3.6458 | 0.0721 | | | |
| 9 | FIFTH LENS | -154.2135 | 0.4833 | 1.650 | 21.5 | -12.400 |
| 10 | | 8.6655 | 0.1092 | | | |
| 11 | SIXTH LENS | 1.5368 | 0.7735 | 1.544 | 56.0 | 25.660 |
| 12 | | 1.4191 | 0.2578 | | | |
| 13 | FILTER | INFINITY | 0.1293 | | | |
| 14 | | INFINITY | 0.7952 | | | |
| 15 | IMAGING PLANE | INFINITY | 0.0077 | | | |

FIG. 12

OPTICAL SYSTEM

CROSS-REFERENCE TO RELATED APPLICATIONS

This application is a continuation application of U.S. patent application Ser. No. 16/441,605, filed on Jun. 14, 2019, now U.S. Pat. No. 11,698,513 issued on Jul. 11, 2023, which is a divisional application of U.S. patent application Ser. No. 15/059,888, filed on Mar. 3, 2016, now U.S. Pat. No. 10,444,470 issued on Oct. 15, 2019, which claims the benefit under 35 USC § 119 (a) of Korean Patent Application No. 10-2015-0101227 filed on Jul. 16, 2015, in the Korean Intellectual Property Office, the entire disclosures of which are incorporated herein by reference for all purposes.

BACKGROUND

1. Field

The following description relates to a small optical system mounted in a portable terminal apparatus.

2. Description of Related Art

A camera module is mounted within a portable terminal. The camera module includes an optical system and an image sensor. The optical system includes a plurality of lenses, and the image sensor includes a plurality of sensor devices that convert optical signals into electrical signals.

An optimal performance of the optical system and the image sensor is needed in order to improve performance of the camera module. However, in the camera module mounted in the portable terminal, performance of the optical system and the image sensor is not easily improved due to spatial limitations of the portable terminal. As an example, it is difficult to increase a size of the image sensor of the camera module to produce a high-resolution camera module. Therefore, an optical system having a wide field of view and having an overall focal length (F) number of 2.0 or less to produce a high-resolution camera module is desired to be developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, an optical system, includes a first lens including a positive refractive power; a second lens including a negative refractive power; a third lens including a positive refractive power; a fourth lens including a negative refractive power; a fifth lens including a negative refractive power; and a sixth lens including a positive refractive power and an inflection point formed on an image-side surface thereof, wherein $70<FOV$ is satisfied, where FOV is a field of view of the optical system.

$SD/f<0.6$ may be satisfied, where SD is a diameter of a stop, and f is an overall focal length of the optical system.

$10<|V1-V4|$ may be satisfied, where V1 is an Abbe number of the first lens, and V4 is an Abbe number of the fourth lens.

$(r7+r8)/(r7+r8)<0$ may be satisfied, where r7 is a radius of curvature of an object-side surface of the fourth lens, and r8 is a radius of curvature of an image-side surface of the fourth lens.

$TTL/f<1.3$ may be satisfied, where TTL is a distance from an object-side surface of the first lens to an imaging plane, and f is an overall focal length of the optical system.

$10<V1-V5$ may be satisfied, wherein V1 is an Abbe number of the first lens, and V5 is an Abbe number of the fifth lens.

$0.5 \leq SD/f$ may be satisfied, where SD is a diameter of a stop, and f is an overall focal length of the optical system.

$|V4-V5|<10$ may be satisfied, where V4 is an Abbe number of the fourth lens, and f5 is an Abbe number of the fifth lens.

In accordance with another embodiment, an optical system, includes a first lens including a convex image-side surface; a second lens including a refractive power; a third lens including a concave object-side surface; a fourth lens including a refractive power; a fifth lens including a concave object-side surface and a concave image-side surface; and a sixth lens including an inflection point formed on a concave image-side surface thereof.

An object-side surface of the first lens may be convex.

The second lens may include a meniscus shape of which an object-side surface is convex.

An image-side surface of the third lens may be convex.

The fourth lens may have a meniscus shape of which an image-side surface is convex.

An object-side surface of the sixth lens may be convex.

The first lens may include a positive refractive power.

The sixth lens may include a positive refractive power.

In accordance with a further embodiment, an optical system, includes lenses sequentially disposed from an object side to an image side; a fourth lens of the lenses including a convex image-side surface; and a fifth lens of the lenses including an image-side surface including an inflection point and a concave object-side surface, wherein the fourth and the fifth lenses comprise a same refractive index and a negative refractive power.

A first lens may include a positive refractive power, a second lens may include a negative refractive power, a third lens may include a positive refractive power, and a sixth lens may include a positive refractive power.

A field of view of the optical system may be greater than 70.

An absolute difference between an Abbe number of the fourth lens and an Abbe number of the fifth lens may be less than 10.

An absolute difference between an Abbe number of the first lens and an Abbe number of the fourth lens may be greater than 10.

A ratio of a distance from an object-side surface of the first lens to the image side and an overall focal length of the optical system may be less than 1.3.

The optical system may also include a stop disposed adjacently to an object-side surface of the first lens, wherein a ratio of an aperture diameter of the stop and an overall focal length of the optical system may be greater or equal to 0.5 and less than 0.6.

A difference between an Abbe number of the first lens and an Abbe number of the fifth lens may be greater than 10.

In accordance with an embodiment, an optical system, includes lenses sequentially disposed from an object side to an image side; a fourth lens of the lenses including a convex image-side surface and a negative refractive power; and a fifth lens of the lenses including a negative refractive power and an inflection point formed on an image-side surface thereof, wherein a ratio of, a difference between a radius of curvature of an object-side surface and a radius of curvature of the image-side surface of the fourth lens, and, a sum of the radius of curvature of the object-side surface and the radius of curvature of the image-side surface of the fourth lens, is less than zero.

A first lens may include a positive refractive power, a second lens may include a negative refractive power, a third lens may include a positive refractive power, and a sixth lens may include a positive refractive power.

A field of view of the optical system may be greater than 70.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of the optical system illustrated in FIG. 1;

FIG. 6 is a table representing characteristics of the optical system illustrated in FIG. 4;

FIG. 9 is a table representing characteristics of the optical system illustrated in FIG. 7;

FIG. 12 is a table representing characteristics of the optical system illustrated in FIG. 10.

Figure 1:
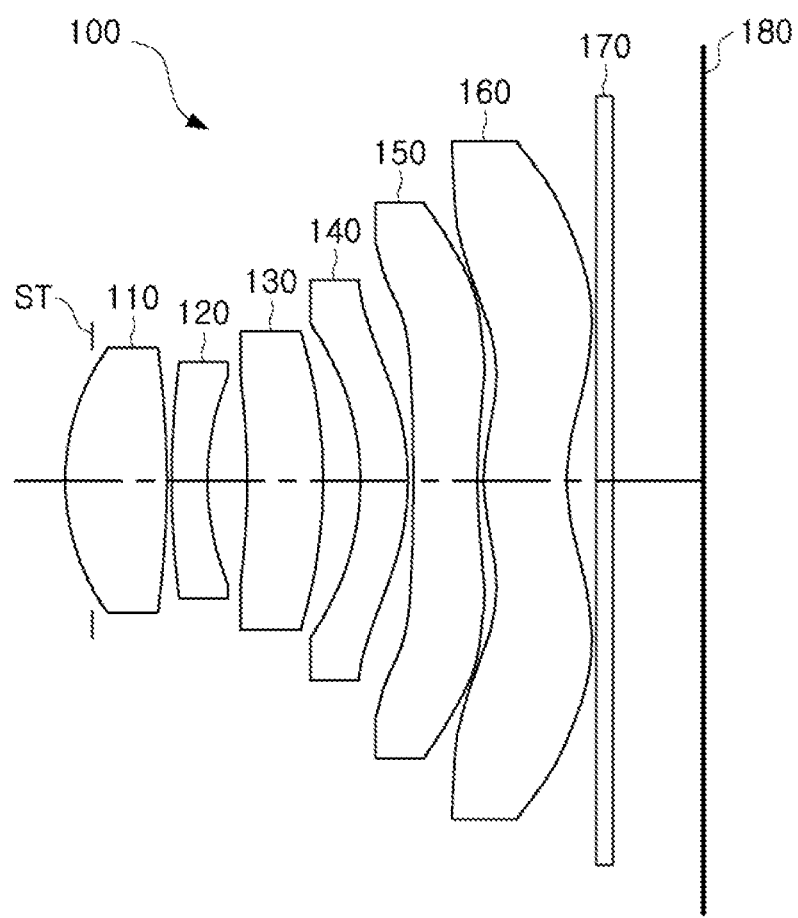
FIG. 1 is a view of an optical system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In addition, in accordance with an embodiment, a first lens refers to a lens closest to an object or a subject from which an image is captured. A sixth lens is a lens closest to an image sensor or an imaging plane. In an embodiment, all numerical values of radii, thicknesses/distances, TTLs, and the like, of lenses are indicated in millimeters (mm), unless otherwise described. A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

In addition, concerning shapes of lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

The first lens has a refractive power. As an example, the first lens has a positive refractive power. An object-side surface of the first lens is convex. The first lens has an aspherical surface. As an example, both of the object-side surface and an image-side surface of the first lens are aspherical. The first lens is made of plastic or a polyurethane material. However, a material of the first lens is not limited to plastic. For instance, the material may include glass.

The second lens has a refractive power. As an example, the second lens has a negative refractive power. The second lens has a meniscus shape of which an object-side surface is convex. In an alternative embodiment, the first surface or the object-side surface of the second lens is flat or substantially flat and the second surface or the image-side surface is concave. The second lens has an aspherical surface. As an example, both of the object-side surface and an image-side surface of the second lens are aspherical. The second lens is made of plastic or a polyurethane material. However, a material of the second lens is not limited to plastic. For instance, the material may include glass.

The third lens has a refractive power. As an example, the third lens has a positive refractive power. An object-side surface of the third lens is concave. The third lens has an aspherical surface. As an example, both of the object-side surface and an image-side surface of the third lens are aspherical. The third lens may be formed of plastic or a polyurethane material. However, a material of the third lens is not limited to plastic or a polyurethane material. For instance, the material may include glass.

The fourth lens has a refractive power. As an example, the fourth lens has a negative refractive power. The fourth lens has a meniscus shape of which an image-side surface is convex. The fourth lens has an aspherical surface. As an example, both of an object-side surface and the image-side surface of the fourth lens are aspherical. The fourth lens is made of plastic or a polyurethane material. However, a material of the fourth lens is not limited to plastic. For instance, the material may include glass. In one example, the image-side surface of the fourth lens is concave in a paraxial region and gradually flattens at edge portions thereof. In another example, the image-side surface of the fourth lens is convex in a paraxial region.

The fifth lens has a refractive power. As an example, the fifth lens has a negative refractive power. Both surfaces of the fifth lens are concave. The fifth lens has an aspherical surface. As an example, both of an object-side surface and an image-side surface of the fifth lens are aspherical. The fifth lens has an inflection point. As an example, one or more inflection points may be formed on the image-side surface of the fifth lens. The fifth lens is made of plastic or a polyurethane material. However, a material of the fifth lens is not limited to plastic. For instance, the material may include glass.

The sixth lens has a refractive power. As an example, the sixth lens has a positive refractive power. An image-side surface of the sixth lens is concave. The sixth lens may have an aspherical surface. As an example, both of an object-side surface and the image-side surface of the sixth lens may be aspherical. The sixth lens may have an inflection point. As an example, one or more inflection points may be formed on the image-side surface of the sixth lens. The sixth lens may be formed of plastic. However, a material of the sixth lens is not limited to plastic or a polyurethane material. For instance, the material may include glass. In an embodiment, the image-side surface of the sixth lens is concave in a paraxial region and gradually curves to be convex towards edge portions thereof.

A person of ordinary skill in the relevant art will appreciate that each of the first through fifth lenses may be configured in an opposite refractive power from the configuration described above. For example, in an alternative configuration, the first lens has a negative refractive power, the second lens has a positive refractive power, the third lens has a negative refractive power, the fourth lens has a positive refractive power, the fifth lens has a positive refractive power, and the sixth lens has a negative refractive power.

The optical system includes a filter and an image sensor. The filter is disposed between the sixth lens and the image sensor. The filter may filter an infrared component from incident light refracted through the first to sixth lenses. The image sensor is disposed behind the filter, and converts the incident light refracted through the first to sixth lenses into electrical signals.

The optical system includes a stop. The stop may adjust an amount of light incident to the first to sixth lenses. As an example, the stop is disposed adjacently to the object-side surface of the first lens to adjust an amount of light incident to the first lens.

The optical system satisfies Conditional Expression 1:

$$SD/f<0.6. \qquad \text{[Conditional Expression 1]}$$

In one example, SD is an aperture diameter of the stop, and f is an overall focal length of the optical system. The above Conditional Expression 1 indicates a numerical condition that limits the aperture diameter of the stop to the overall focal length of the optical system. As an example, in the optical system in which SD/f is out of an upper limit value of the above Conditional Expression 1, a large amount of light is incident to the image sensor, and thus it may be difficult to photograph a clear image in the daytime.

The optical system satisfies Conditional Expression 2:

$$10<|V1-V4|. \qquad \text{[Conditional Expression 2]}$$

In an example, V1 is an Abbe number of the first lens, and V4 is an Abbe number of the fourth lens. Conditional Expression 2 indicates a condition that limits material characteristics of the fourth lens to the first lens. As an example, in a case in which $|V1-V4|$ is below a lower limit value of Conditional Expression 2, the fourth lens has a low refractive index, thus, making it difficult to design the fourth lens.

The optical system satisfies Conditional Expression 3:

$$70<FOV. \qquad \text{[Conditional Expression 3]}$$

In an example, FOV is a field of view of the optical system. Conditional Expression 3 indicates a condition that embodies an optical system having a wide field of view.

The optical system satisfies Conditional Expression 4:

$$(r7-r8)/(r7+r8)<0. \qquad \text{[Conditional Expression 4]}$$

In an example, r7 is a radius of curvature of the object-side surface of the fourth lens, and r8 is a radius of curvature of the image-side surface of the fourth lens. Conditional Expression 4 is a numerical condition for an optical design of the fourth lens. As an example, in a case in which Conditional Expression 4 is satisfied, the fourth lens may be easily manufactured.

The optical system satisfies Conditional Expression 5:

$$TTL/f<1.3.$$ [Conditional Expression 5]

In an example, TTL is a distance from the object-side surface of the first lens to the image sensor (imaging plane), and f is the overall focal length of the optical system. Conditional Expression 5 is a numerical condition to miniaturize the optical system. As an example, in a case in which TTL/f is over an upper limit value of Conditional Expression 5, it may be difficult to mount the optical system in a portable terminal.

The optical system satisfies Conditional Expression 6:

$$|V4-V5|<10.$$ [Conditional Expression 6]

In one example, V4 is the Abbe number of the fourth lens, and V5 is an Abbe number of the fifth lens. Conditional Expression 6 indicates a condition to limit material characteristics of the fourth and fifth lenses. As an example, the fourth and fifth lenses are formed of the same material, or may have the same refractive index so that |V4-V5| is not above an upper limit value of Conditional Expression 6.

The optical system satisfies Conditional Expression 7:

$$0.5 \geq SD/f.$$ [Conditional Expression 7]

In one example, SD is the aperture diameter of the stop, and f is the overall focal length of the optical system. Conditional Expression 7 indicates a numerical condition to limit the aperture diameter of the stop to the overall focal length of the optical system. As an example, in the optical system in which SD/f is below a lower limit value of Conditional Expression 7, a small amount of light is incident to the image sensor, and thus it may be difficult to photograph a clear image at night.

The optical system configured as described above has a wide field of view and a bright F number. As an example, the optical system, according to an embodiment, has an F number of 2.0 or less.

Next, several embodiments will be described.

An optical system, according to a first embodiment, will be described with reference to FIG. 1.

The optical system 100, according to an embodiment, includes first to sixth lenses 110 to 160. The first to sixth lenses 110 to 160 are sequentially disposed from an object side toward an imaging plane.

The first lens 110 has a positive refractive power. An object-side surface of the first lens 110 is convex, and an image-side surface thereof is convex. The first lens 110 has an aspherical shape. As an example, both of the object-side surface and the image-side surface of the first lens 110 are aspherical. The first lens 110 is made of plastic. As an example, the first lens 110 is made of plastic having a refractive index of 1.544. A focal length of the first lens 110 is 2.560 mm.

The second lens 120 has a negative refractive power. An object-side surface of the second lens 120 is convex, and an image-side surface thereof is concave. The second lens 120 has an aspherical shape. As an example, both of the object-side surface and the image-side surface of the second lens 120 are aspherical. The second lens 120 is made of plastic. As an example, the second lens 120 is made of plastic having a refractive index of 1.634. A focal length of the second lens 120 is -5.080 mm.

The third lens 130 has a positive refractive power. An object-side surface of the third lens 130 is concave, and an image-side surface thereof is convex. The third lens 130 has an aspherical shape. As an example, both of the object-side surface and the image-side surface of the third lens 130 are aspherical. The third lens 130 is made of plastic. As an example, the third lens 130 is made of plastic having a refractive index of 1.544. A focal length of the third lens 130 is 11.330 mm.

The fourth lens 140 has a negative refractive power. An object-side surface of the fourth lens 140 is concave, and an image-side surface thereof is convex. The fourth lens 140 has an aspherical shape. As an example, both of the object-side surface and the image-side surface of the fourth lens 140 are aspherical. The fourth lens 140 is made of plastic. As an example, the fourth lens 140 is made of plastic having a refractive index of 1.649. A focal length of the fourth lens 140 is -738.79 mm.

The fifth lens 150 has a negative refractive power. An object-side surface of the fifth lens 150 is concave, and an image-side surface thereof is concave. The fifth lens 150 has an aspherical shape. As an example, both of the object-side surface and the image-side surface of the fifth lens 150 are aspherical. An inflection point is formed on the fifth lens 150. As an example, one or more inflection points are formed on the image-side surface of the fifth lens 150. The fifth lens 150 are formed of plastic. As an example, the fifth lens 150 is made of plastic having a refractive index of 1.649. A focal length of the fifth lens 150 is -5.130 mm.

The sixth lens 160 has a positive refractive power. An object-side surface of the sixth lens 160 is convex, and an image-side surface thereof is concave. The sixth lens 160 has an aspherical shape. As an example, both of the object-side surface and the image-side surface of the sixth lens 160 are aspherical. An inflection point is formed on the sixth lens 160. As an example, one or more inflection points are formed on the object-side surface and the image-side surface of the sixth lens 160. The sixth lens 160 is made of plastic. As an example, the sixth lens 160 is made of plastic having a refractive index of 1.534. A focal length of the sixth lens 160 is 10.960 mm.

The optical system 100 includes a filter 170 and an image sensor 180.

The filter 170 is adjacently disposed to the image-side surface of the sixth lens 160. The filter 170 has a substantially flat plate. The filter 170 filters infrared rays from light refracted from the sixth lens 160.

The image sensor 180 is disposed behind the filter 170. The image sensor 180 has a predetermined size. As an example, a distance (ImgH) from an intersection point between an imaging plane of the image sensor 180 and an optical axis to a diagonal corner of the image sensor 180 may be 3.03 mm.

In one embodiment, the optical system 100 includes a stop ST. In an example, the stop ST is adjacently disposed to the object-side surface of the first lens 110. However, a person skill in the art will appreciate that the stop ST may be positioned in between two of the lenses 110 to 160.

Figure 2:
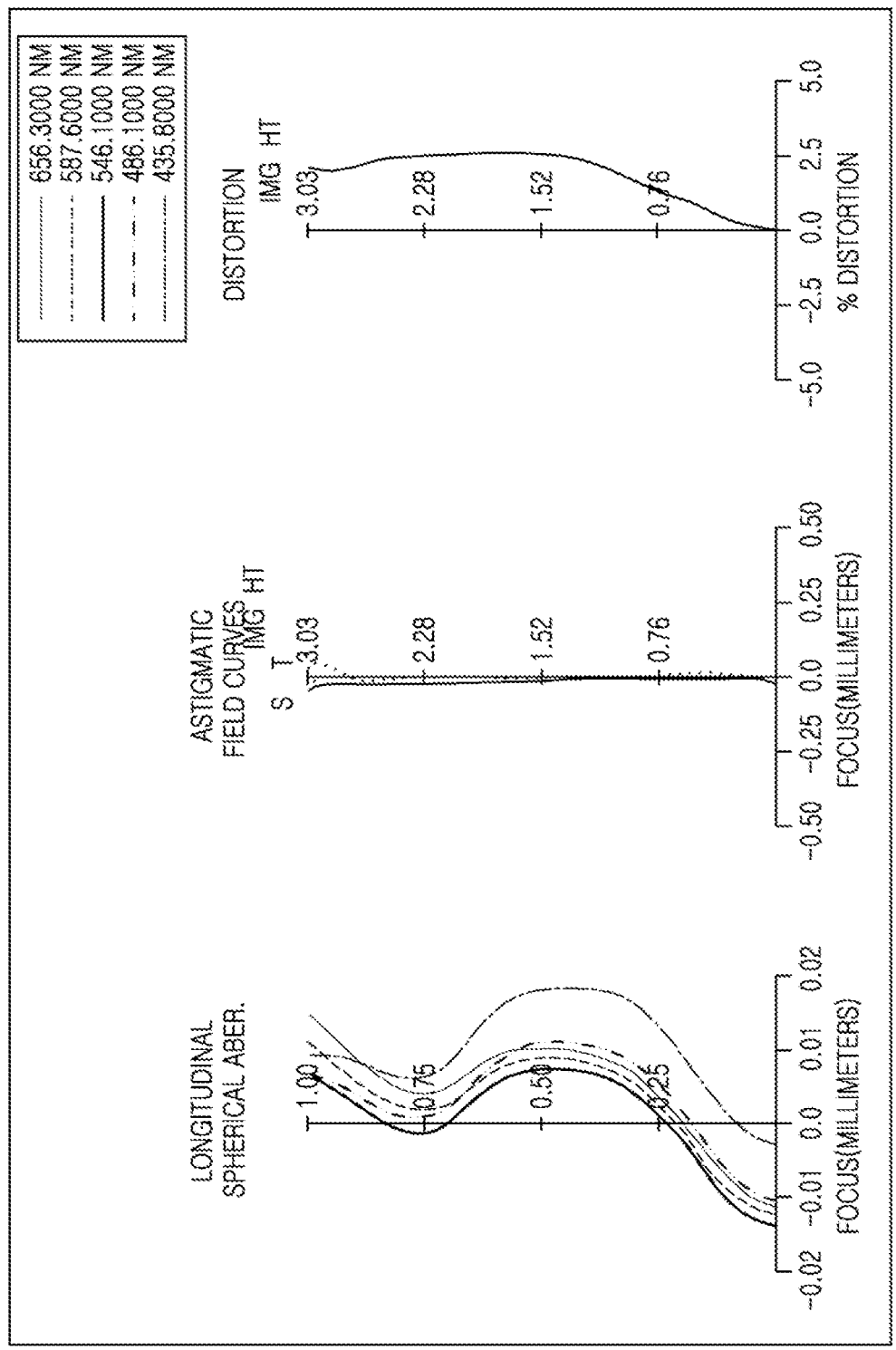
FIG. 2 contains graphs having curves representing aberration characteristics of the optical system illustrated in FIG. 1.

The optical system 100 configured as described above may represent aberration characteristics and optical characteristics as illustrated in FIGS. 2 and 3. As an example, an F number of the optical system 100, according to an embodiment is 1.90, an overall length (TTL), which is a distance from the object-side surface of the first lens to the imaging plane of the optical system 100, is 4.47 mm, and an overall focal length of the optical system 100 is 3.680 mm.

Figure 4:
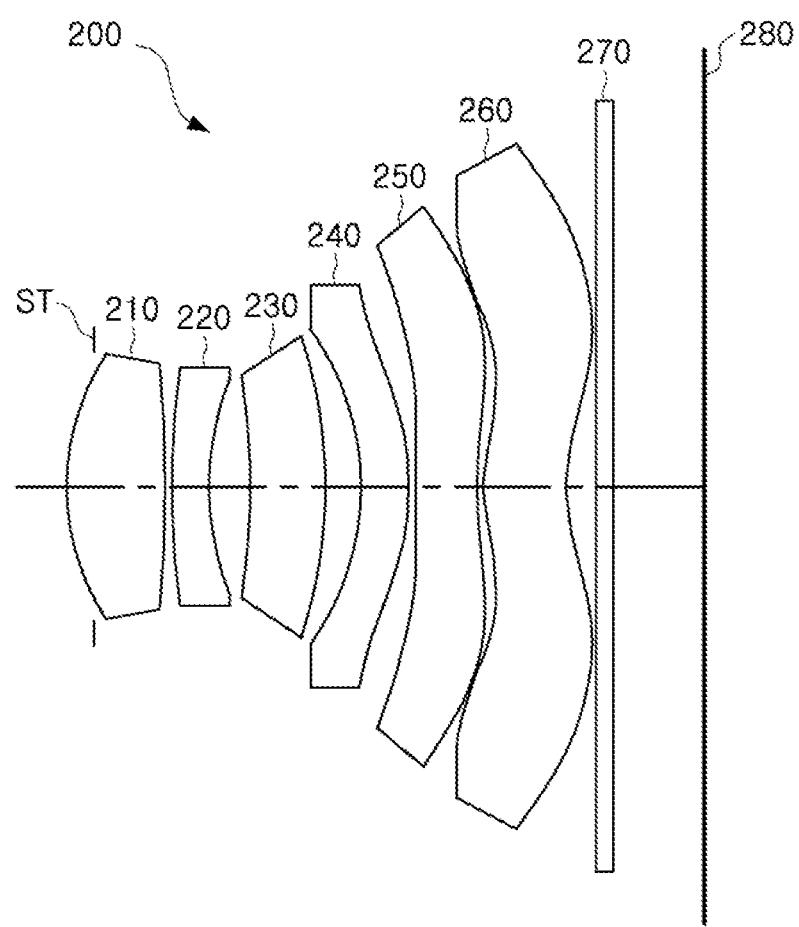
FIG. 4 is a view of an optical system, according to a second embodiment.

FIG. 4 is a view of an optical system, according to a second embodiment.

The optical system 200, according to an embodiment, includes first to sixth lenses 210 to 260. The first to sixth lenses 210 to 260 are sequentially disposed from an object side toward an imaging plane.

The first lens 210 has a positive refractive power. An object-side surface of the first lens 210 is convex, and an image-side surface thereof is convex. The first lens 210 has an aspherical shape. As an example, both of the object-side surface and the image-side surface of the first lens 210 are aspherical. The first lens 210 is formed of plastic. As an example, the first lens 210 is formed of plastic having a refractive index of 1.544. A focal length of the first lens 210 is 2.560 mm.

The second lens 220 has a negative refractive power. An object-side surface of the second lens 220 is convex, and an image-side surface thereof is concave. The second lens 220 has an aspherical shape. As an example, both of the object-side surface and the image-side surface of the second lens 220 are aspherical. The second lens 220 is formed of plastic. As an example, the second lens 220 is formed of plastic having a refractive index of 1.634. A focal length of the second lens 220 is −5.080 mm.

The third lens 230 has a positive refractive power. An object-side surface of the third lens 230 is concave, and an image-side surface thereof is convex. The third lens 230 has an aspherical shape. As an example, both of the object-side surface and the image-side surface of the third lens 230 are aspherical. The third lens 230 is formed of plastic. As an example, the third lens 230 is formed of plastic having a refractive index of 1.544. A focal length of the third lens 230 is 11.390 mm.

The fourth lens 240 has a negative refractive power. An object-side surface of the fourth lens 240 is concave, and an image-side surface thereof is convex. The fourth lens 240 has an aspherical shape. As an example, both of the object-side surface and the image-side surface of the fourth lens 240 are aspherical. The fourth lens 240 is formed of plastic. As an example, the fourth lens 240 is formed of plastic having a refractive index of 1.649. A focal length of the fourth lens 240 is −2316.64 mm.

The fifth lens 250 has a negative refractive power. An object-side surface of the fifth lens 250 is concave, and an image-side surface thereof is concave. The fifth lens 250 has an aspherical shape. As an example, both of the object-side surface and the image-side surface of the fifth lens 250 are aspherical. An inflection point is formed on the fifth lens 250. As an example, one or more inflection points is formed on the image-side surface of the fifth lens 250. The fifth lens 250 is formed of plastic. As an example, the fifth lens 250 is formed of plastic having a refractive index of 1.649. A focal length of the fifth lens 250 is −5.130 mm.

The sixth lens 260 has a positive refractive power. An object-side surface of the sixth lens 260 is convex, and an image-side surface thereof is concave. The sixth lens 260 has an aspherical shape. As an example, both of the object-side surface and the image-side surface of the sixth lens 260 are aspherical. An inflection point is formed on the sixth lens 260. As an example, one or more inflection points is formed on the object-side surface and the image-side surface of the sixth lens 260. The sixth lens 260 is formed of plastic. As an example, the sixth lens 260 is formed of plastic having a refractive index of 1.534. A focal length of the sixth lens 260 is 10.950 mm.

The optical system 200 includes a filter 270 and an image sensor 280.

The filter 270 is disposed adjacently to the image-side surface of the sixth lens 260. The filter 270 has a substantially flat plate. The filter 270 filters, in one example, infrared rays from light refracted from the sixth lens 260.

The image sensor 280 is disposed behind the filter 270. The image sensor 280 has a predetermined size. As an example, a distance (ImgH) from an intersection point between an imaging plane of the image sensor 280 and an optical axis to a diagonal corner of the image sensor 280 is 3.03 mm.

The optical system 200 includes a stop ST. The stop ST is disposed adjacently to the object-side surface of the first lens 210.

Figure 5:
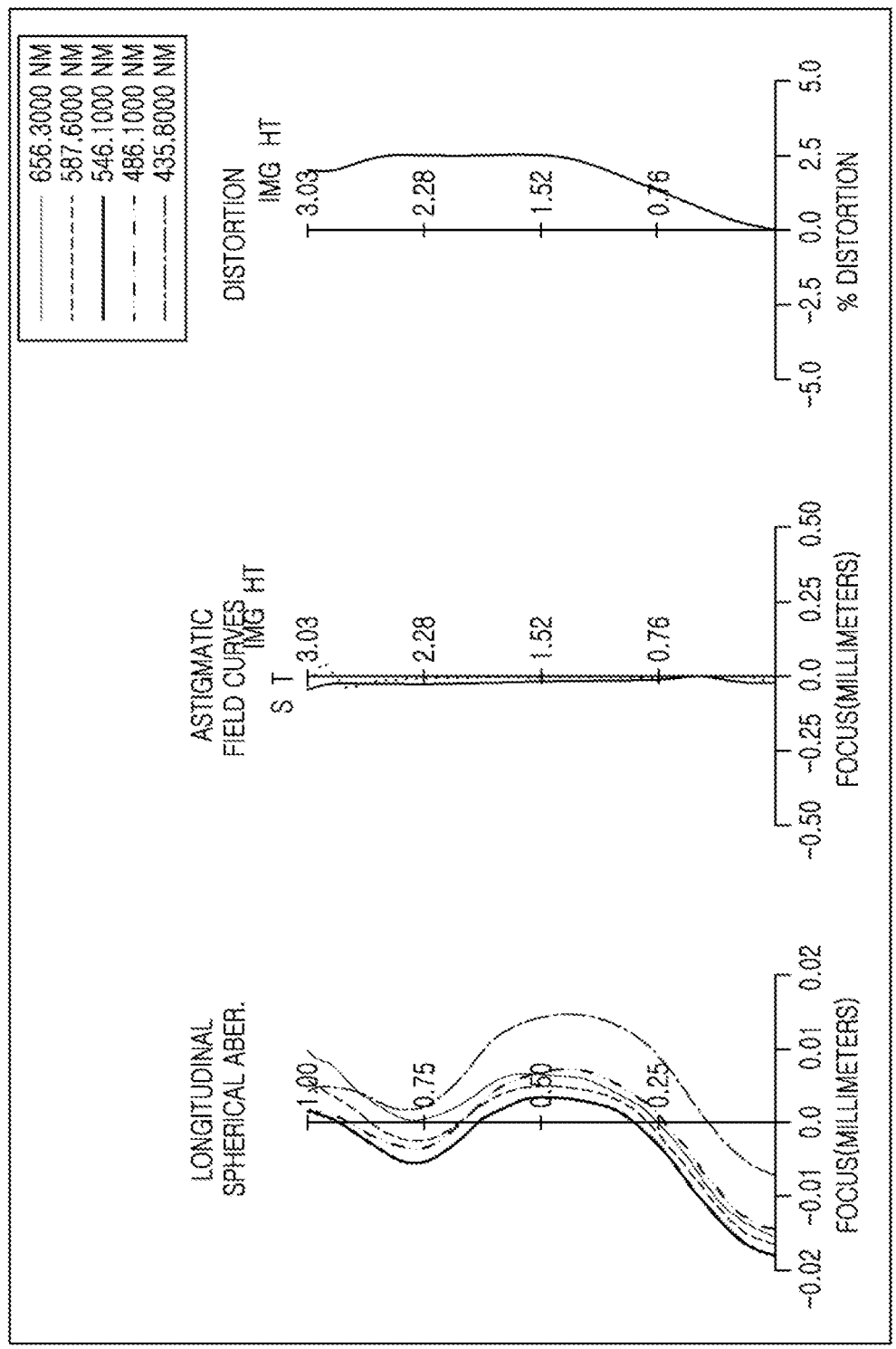
FIG. 5 contains graphs having curves representing aberration characteristics of the optical system illustrated in FIG. 4.

The optical system 200 configured as described above may represent aberration characteristics and optical characteristics as illustrated in FIGS. 5 and 6. As an example, an F number of the optical system 200, according to an embodiment, is 1.99, an overall length (TTL), which is a distance from the object-side surface of the first lens to the imaging plane of the optical system 200, is 4.47 mm, and an overall focal length of the optical system 200 is 3.680 mm.

Figure 7:
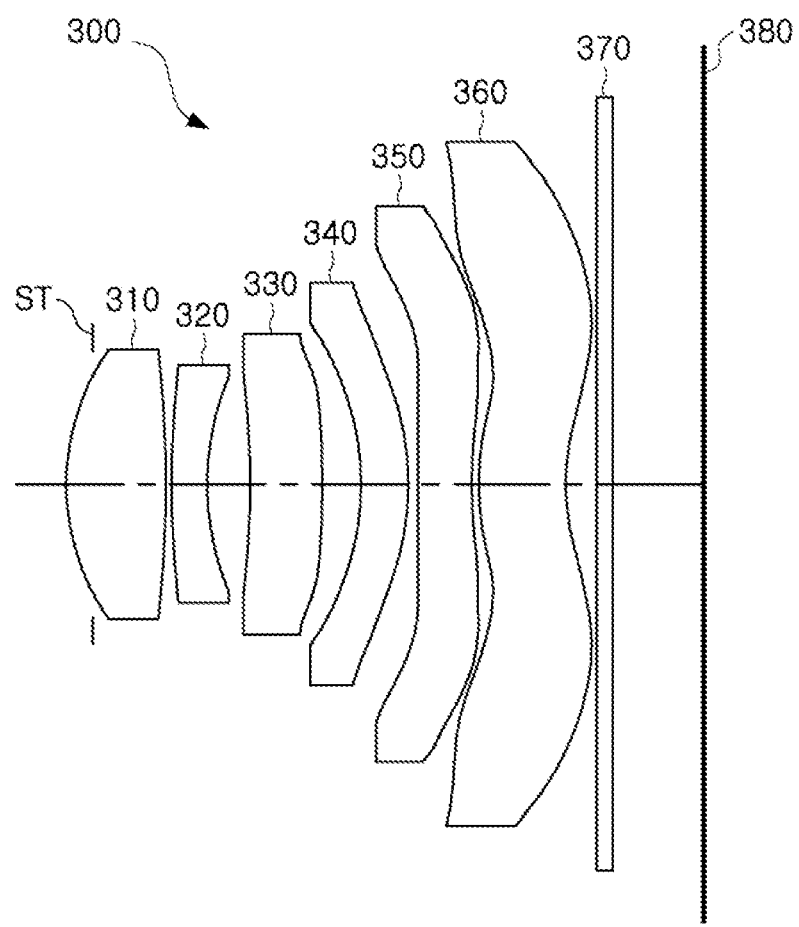
FIG. 7 is a view of an optical system, according to a third embodiment.

FIG. 7 is a view of an optical system, according to a third embodiment.

The optical system 300, according to an embodiment, includes first to sixth lenses 310 to 360. The first to sixth lenses 310 to 360 are sequentially disposed from an object side toward an imaging plane.

The first lens 310 has a positive refractive power. An object-side surface of the first lens 310 is convex, and an image-side surface thereof is convex. The first lens 310 has an aspherical shape. As an example, both of the object-side surface and the image-side surface of the first lens 310 are aspherical. The first lens 310 is formed of plastic. As an example, the first lens 310 is formed of plastic having a refractive index of 1.544. A focal length of the first lens 310 is 2.530 mm.

The second lens 320 has a negative refractive power. An object-side surface of the second lens 320 is convex, and an image-side surface thereof is concave. The second lens 320 has an aspherical shape. As an example, both of the object-side surface and the image-side surface of the second lens 320 are aspherical. The second lens 320 is formed of plastic. As an example, the second lens 320 is formed of plastic having a refractive index of 1.634. A focal length of the second lens 320 is −4.700 mm.

The third lens 330 has a positive refractive power. An object-side surface of the third lens 330 is concave, and an image-side surface thereof is convex. The third lens 330 has an aspherical shape. As an example, both of the object-side surface and the image-side surface of the third lens 330 are aspherical. The third lens 330 is formed of plastic. As an example, the third lens 330 is formed of plastic having a refractive index of 1.544. A focal length of the third lens 330 is 10.900 mm.

The fourth lens 340 has a negative refractive power. An object-side surface of the fourth lens 340 is concave, and an image-side surface thereof is convex. The fourth lens 340 has an aspherical shape. As an example, both of the object-side surface and the image-side surface of the fourth lens 340 are aspherical. The fourth lens 340 is formed of plastic. As an example, the fourth lens 340 is formed of plastic having a refractive index of 1.634. A focal length of the fourth lens 340 is −151.35 mm.

The fifth lens 350 has a negative refractive power. An object-side surface of the fifth lens 350 is concave, and an image-side surface thereof is concave. The fifth lens 350 has an aspherical shape. As an example, both of the object-side surface and the image-side surface of the fifth lens 350 are aspherical. An inflection point is formed on the fifth lens 350. As an example, one or more inflection points is formed on the image-side surface of the fifth lens 350. The fifth lens 350 is formed of plastic. As an example, the fifth lens 350 is formed of plastic having a refractive index of 1.634. A focal length of the fifth lens 350 is −5.120 mm.

The sixth lens 360 has a positive refractive power. An object-side surface of the sixth lens 360 is convex, and an image-side surface thereof is concave. The sixth lens 360 has an aspherical shape. As an example, both of the object-side surface and the image-side surface of the sixth lens 360 are aspherical. An inflection point is formed on the sixth lens 360. As an example, one or more inflection points is formed on the object-side surface and the image-side surface of the sixth lens 360. The sixth lens 360 is formed of plastic. As an example, the sixth lens 360 is formed of plastic having a refractive index of 1.534. A focal length of the sixth lens 360 is 9.060 mm.

The optical system 300 includes a filter 370 and an image sensor 380.

The filter 370 is adjacently disposed to the image-side surface of the sixth lens 360. The filter 370 has a substantially flat plate. The filter 370 filters infrared rays from light refracted from the sixth lens 360.

The image sensor 380 is disposed behind the filter 370. The image sensor 380 has a predetermined size. As an example, a distance (ImgH) from an intersection point between an imaging plane of the image sensor 380 and an optical axis to a diagonal corner of the image sensor 380 is 3.04 mm.

The optical system 300 includes a stop ST. The stop ST is disposed adjacently to the object-side surface of the first lens 310.

Figure 8:
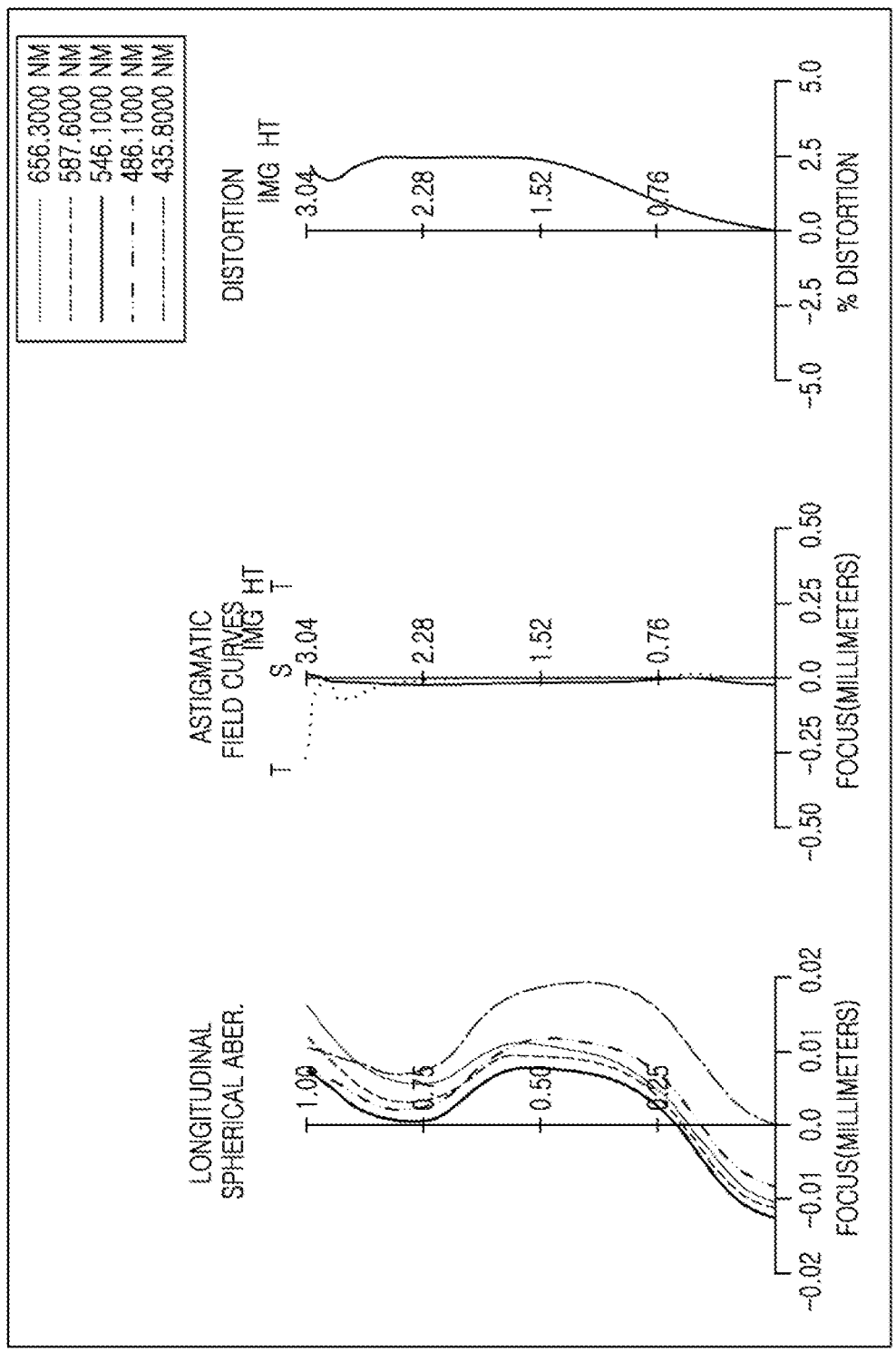
FIG. 8 contains graphs having curves representing aberration characteristics of the optical system illustrated in FIG. 7.

The optical system 300, configured as described above, represents aberration characteristics and optical characteristics as illustrated in FIGS. 8 and 9. As an example, an F number of the optical system 300, according to an embodiment, is 1.99, an overall length (TTL), which is a distance from the object-side surface of the first lens to the imaging plane of the optical system 300, is 4.47 mm, and an overall focal length of the optical system 300 is 3.690 mm.

Figure 10:
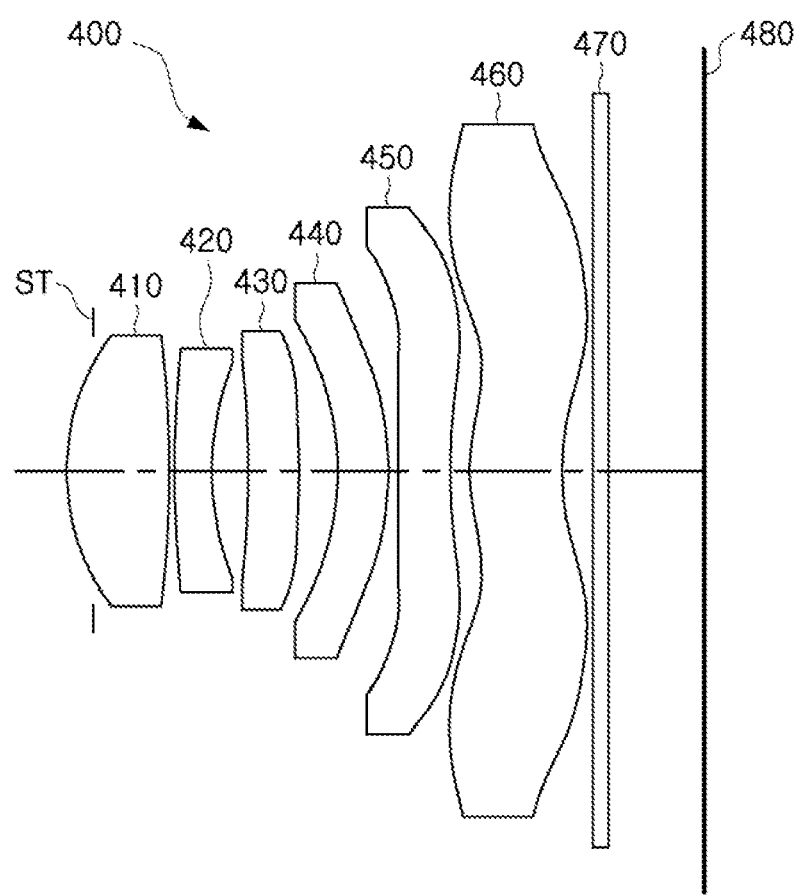
FIG. 10 is a view of an optical system, according to a fourth embodiment.

FIG. 10 is a view of an optical system, according to a fourth embodiment.

The optical system 400, according to an embodiment, includes first to sixth lenses 410 to 460. The first to sixth lenses 410 to 460 are sequentially disposed from an object toward an imaging plane.

The first lens 410 has a positive refractive power. An object-side surface of the first lens 410 is convex, and an image-side surface thereof is convex. The first lens 410 has an aspherical shape. As an example, both of the object-side surface and the image-side surface of the first lens 410 are aspherical. The first lens 410 is formed of plastic. As an example, the first lens 410 is formed of plastic having a refractive index of 1.544. A focal length of the first lens 410 is 2.880 mm.

The second lens 420 has a negative refractive power. An object-side surface of the second lens 420 is convex, and an image-side surface thereof is concave. The second lens 420 has an aspherical shape. As an example, both of the object-side surface and the image-side surface of the second lens 420 are aspherical. The second lens 420 is formed of plastic. As an example, the second lens 420 is formed of plastic having a refractive index of 1.650. A focal length of the second lens 420 is −4.950 mm.

The third lens 430 has a positive refractive power. An object-side surface of the third lens 430 is concave, and an image-side surface thereof is convex. The third lens 430 has an aspherical shape. As an example, both of the object-side surface and the image-side surface of the third lens 430 are aspherical. The third lens 430 is formed of plastic. As an example, the third lens 430 is formed of plastic having a refractive index of 1.544. A focal length of the third lens 430 is 20.700 mm.

The fourth lens 440 has a negative refractive power. An object-side surface of the fourth lens 440 is concave, and an image-side surface thereof is convex. The fourth lens 440 has an aspherical shape. As an example, both of the object-side surface and the image-side surface of the fourth lens 440 are aspherical. The fourth lens 440 is formed of plastic. As an example, the fourth lens 440 is formed of plastic having a refractive index of 1.650. A focal length of the fourth lens 440 is −74.30 mm.

The fifth lens 450 has a negative refractive power. An object-side surface of the fifth lens 450 is concave, and an image-side surface thereof is concave. The fifth lens 450 has an aspherical shape. As an example, both of the object-side surface and the image-side surface of the fifth lens 450 are aspherical. An inflection point is formed on the fifth lens 450. As an example, one or more inflection points is formed on the image-side surface of the fifth lens 450. The fifth lens 450 is formed of plastic. As an example, the fifth lens 450 is formed of plastic having a refractive index of 1.650. A focal length of the fifth lens 350 is −12.40 mm.

The sixth lens 460 has a positive refractive power. An object-side surface of the sixth lens 460 is convex, and an image-side surface thereof is concave. The sixth lens 460 has an aspherical shape. As an example, both of the object-side surface and the image-side surface of the sixth lens 460 are aspherical. An inflection point is formed on the sixth lens 460. As an example, one or more inflection points is formed on the object-side surface and the image-side surface of the sixth lens 460. The sixth lens 460 is formed of plastic. As an example, the sixth lens 460 is formed of plastic having a refractive index of 1.544. A focal length of the sixth lens 460 is 25.660 mm.

The optical system 400 includes a filter 470 and an image sensor 480.

The filter 470 is adjacently disposed to the image-side surface of the sixth lens 460. The filter 470 has a substantially flat plate. The filter 470 filters infrared rays from light refracted from the sixth lens 460.

The image sensor 480 is disposed behind the filter 470. The image sensor 480 has a predetermined size. As an example, a distance (ImgH) from an intersection point between an imaging plane of the image sensor 480 and an optical axis to a diagonal corner of the image sensor 480 is 3.42 mm.

The optical system 400 includes a stop ST. The stop ST is adjacently disposed to the object-side surface of the first lens 410.

Figure 11:
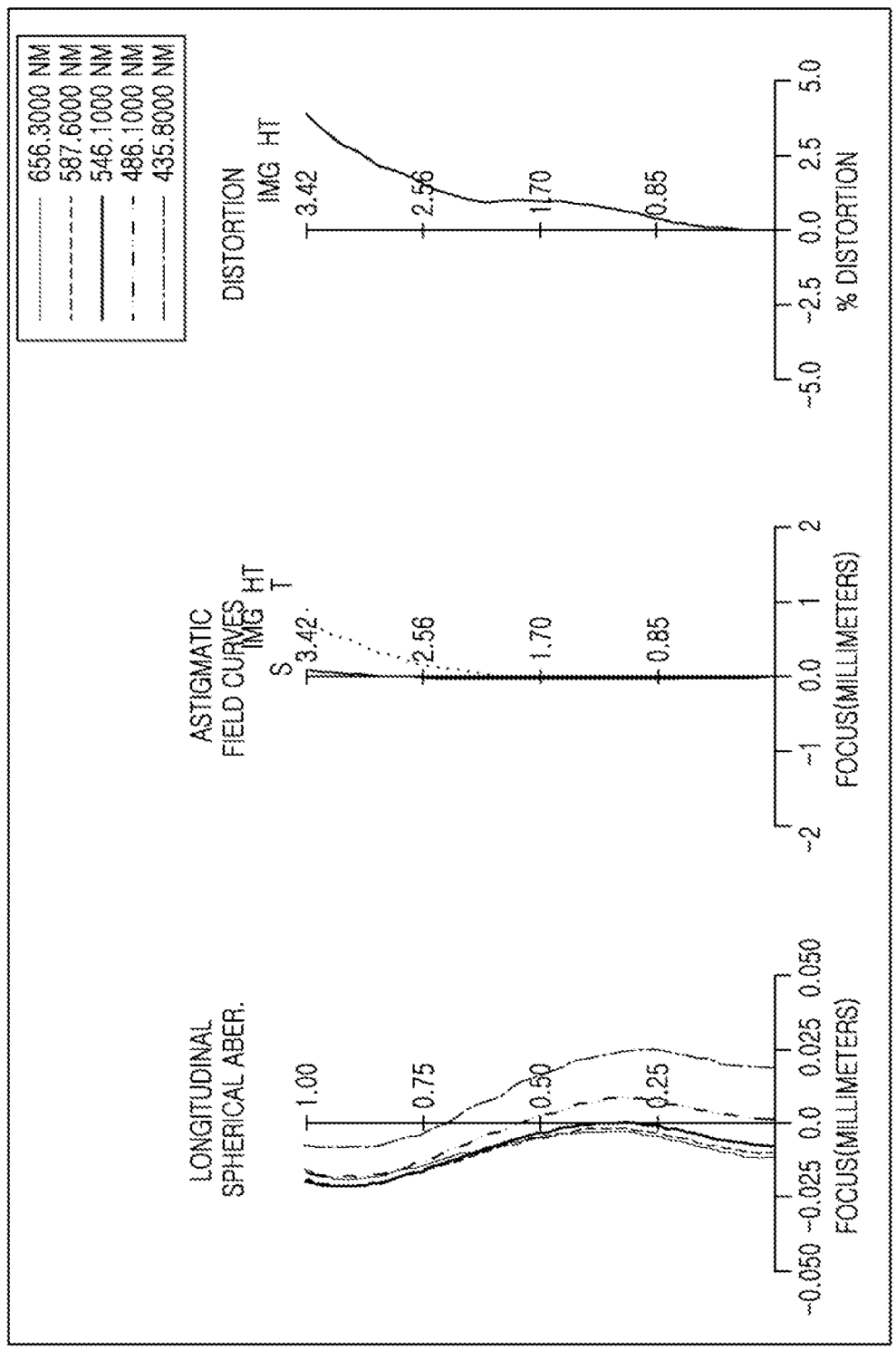
FIG. 11 contains graphs having curves representing aberration characteristics of the optical system illustrated in FIG. 10.

The optical system 400, configured as described above, represents aberration characteristics and optical characteristics as illustrated in FIGS. 11 and 12. As an example, an F number of the optical system 400, according to an embodiment, is 1.90, an overall length (TTL), which is a distance from the object-side surface of the first lens to the imaging plane of the optical system 400, is 5.30 mm, and an overall focal length of the optical system 400 is 4.40 mm.

The optical systems, according to the first to fourth embodiments configured as described above, satisfy all of Conditional Expressions 1 through 7, as represented in Table 1.

TABLE 1

| Remark | Conditional Expression | First Embodiment | Second Embodiment | Third Embodiment | Fourth Embodiment |
|---|---|---|---|---|---|
| 1 | SD/f < 0.6 | 0.500 | 0.500 | 0.500 | 0.580 |
| 2 | 10 < |V1 − V4| | 34.9 | 34.9 | 32.1 | 34.5 |
| 3 | 70 < FOV | 78.93 | 78.93 | 78.97 | 75.00 |
| 4 | (r7 − r8)/(r7 + r8) < 0 | −0.034 | −0.033 | −0.041 | −0.059 |
| 5 | TTL/f < 1.3 | 1.215 | 1.216 | 1.211 | 1.206 |
| 6 | 10 < V1 − V5 | 34.9 | 34.9 | 32.1 | 34.5 |
| 7 | |V4 − V5| < 10 | 0.00 | 0.00 | 0.00 | 0.00 |

As set forth above, according to various embodiments, an optical system having a wide field of view and producing brighter images is realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
a first lens comprising a refractive power and a convex image-side surface;
a second lens comprising a convex object-side surface;
a third lens comprising a refractive power;
a fourth lens comprising negative refractive power;
a fifth lens comprising a refractive power; and
a sixth lens comprising a refractive power,
wherein the first to sixth lenses are sequentially disposed from an object side toward an imaging plane,
wherein the optical system has a total number of six lenses with refractive power,
wherein a distance from an image-side surface of the second lens to an object-side surface of the third lens is greater than a distance from an image-side surface of the third lens to an object-side surface of the fourth lens,
wherein a thickness along an optical axis of the third lens is greater than the distance from the image-side surface of the second lens to the object-side surface of the third lens,
wherein a thickness along the optical axis of the first lens is greater than the thickness along the optical axis of the third lens,
wherein the thickness along the optical axis of the first lens is greater than a thickness along the optical axis of the fifth lens,
wherein 10<|V1−V4|, where V1 is an Abbe number of the first lens and V4 is an Abbe number of the fourth lens,
wherein an absolute value of a radius of curvature of an object-side surface of the second lens is greater than an absolute value of a radius of curvature of an object-side surface of the first lens,
wherein an absolute value of a radius of curvature of an image-side surface of the second lens is greater than an absolute value of a radius of curvature of an object-side surface of the sixth lens,
wherein the distance from the image-side surface of the third lens to the object-side surface of the fourth lens is greater than a thickness along the optical axis of the second lens, and
wherein an absolute value of a radius of curvature of the object-side surface of the fourth lens is greater than the absolute value of the radius of curvature of the object-side surface of the first lens.

2. The optical system of claim 1, wherein the first lens has a convex object-side surface.

3. The optical system of claim 1, wherein the second lens has a concave image-side surface.

4. The optical system of claim 1, wherein the third lens has a convex image-side surface.

5. The optical system of claim 1, wherein the sixth lens has a convex object-side surface.

6. The optical system of claim 1, wherein the sixth lens has a concave image-side surface.

7. The optical system of claim 1, wherein the sixth lens has an inflection point formed on an image-side surface of the sixth lens.

8. The optical system of claim 1, wherein a radius of curvature of the object-side surface of the fourth lens is greater than a radius of curvature of an object-side surface of the third lens.

9. The optical system of claim 1, wherein a field of view of the optical system is greater than 70 degree.

10. An optical system, comprising:
a first lens comprising a refractive power;
a second lens comprising a convex object-side surface;
a third lens comprising a refractive power and a convex image-side surface;
a fourth lens comprising negative refractive power;
a fifth lens comprising a refractive power; and
a sixth lens comprising a refractive power,
wherein the first to sixth lenses are sequentially disposed from an object side toward an imaging plane,
wherein the optical system has a total number of six lenses with refractive power,
wherein a distance from an image-side surface of the second lens to an object-side surface of the third lens is greater than a distance from an image-side surface of the third lens to an object-side surface of the fourth lens,
wherein a thickness along an optical axis of the third lens is greater than the distance from the image-side surface of the second lens to the object-side surface of the third lens,
wherein a thickness along the optical axis of the first lens is greater than the thickness along the optical axis of the third lens, wherein the thickness along the optical axis of the first lens is greater than a thickness along the optical axis of the fifth lens, wherein $10<|V1-V4|$, where V1 is an Abbe number of the first lens and V4 is an Abbe number of the fourth lens, wherein an absolute value of a radius of curvature of an object-side surface of the second lens is greater than an absolute value of a radius of curvature of an object-side surface of the first lens, wherein an absolute value of a radius of curvature of an image-side surface of the second lens is greater than an absolute value of a radius of curvature of an object-side surface of the sixth lens, wherein the distance from the image-side surface of the third lens to the object-side surface of the fourth lens is greater than a thickness along the optical axis of the second lens, and wherein an absolute value of a radius of curvature of the object-side surface of the fourth lens is greater than the absolute value of the radius of curvature of the object-side surface of the first lens.

11. The optical system of claim 10, wherein the first lens has a convex object-side surface.

12. The optical system of claim 10, wherein the first lens has a convex image-side surface.

13. The optical system of claim 10, wherein the second lens has a concave image-side surface.

14. The optical system of claim 10, wherein the sixth lens has a convex object-side surface.

15. The optical system of claim 10, wherein the sixth lens has a concave image-side surface.

16. The optical system of claim 10, wherein the sixth lens has an inflection point formed on an image-side surface of the sixth lens.

17. The optical system of claim 10, wherein a radius of curvature of the object-side surface of the fourth lens is greater than a radius of curvature of an object-side surface of the third lens.

18. The optical system of claim 10, wherein a field of view of the optical system is greater than 70 degree.

* * * * *